United States Patent
Akimoto et al.

(10) Patent No.: US 7,911,641 B2
(45) Date of Patent: Mar. 22, 2011

(54) IMAGE FORMING APPARATUS

(75) Inventors: Fusako Akimoto, Tokyo (JP); Kenji Taki, Tokyo (JP); Chikatsu Suzuki, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 733 days.

(21) Appl. No.: 11/957,951

(22) Filed: Dec. 17, 2007

(65) Prior Publication Data

US 2008/0204828 A1  Aug. 28, 2008

(30) Foreign Application Priority Data

Feb. 23, 2007 (JP) ................. 2007-043525
Oct. 30, 2007 (JP) ................. 2007-281475

(51) Int. Cl.
- G06F 15/00 (2006.01)
- G06K 1/00 (2006.01)
- H04N 1/00 (2006.01)
- G06F 3/12 (2006.01)

(52) U.S. Cl. ........................ 358/1.6; 358/1.13

(58) Field of Classification Search .......... 358/1.6, 358/1.1, 1.7, 1.8, 1.13, 1.14, 1.15, 1.18, 505, 358/474; 399/301, 382; 270/52.06

See application file for complete search history.

(56) References Cited

U.S. PATENT DOCUMENTS

| 7,280,797 B2 * | 10/2007 | Moriyama | 399/382 |
| 7,325,800 B2 * | 2/2008 | Brown et al. | 270/52.06 |
| 7,778,579 B2 * | 8/2010 | Ueda et al. | 399/301 |

FOREIGN PATENT DOCUMENTS

| JP | 5-155445 A | 6/1993 |
| JP | 5-158298 A | 6/1993 |
| JP | 11-284801 | 10/1999 |
| JP | 11-284801 A | 10/1999 |

OTHER PUBLICATIONS

Japanese Office Action for Patent Application No. 2007-281475 with English abstract mailed Feb. 10, 2009.

* cited by examiner

*Primary Examiner* — Douglas Q Tran
(74) *Attorney, Agent, or Firm* — Cantor Colburn LLP

(57) ABSTRACT

An image forming apparatus having: a reading section that reads out an image of an original document placed on a document table; a storage section that stores image data obtained by reading out the image by the reading section; a sheet feeding section including a sheet feeding tray and an attachment detection sensor that detects whether or not the sheet feeding tray has been attached; and a control section that executes reading out of the image in a mode in which the image is read while the reading section scans the image of the original document placed on the document table, wherein the control section, when the attachment or detachment of the tray is detected during execution in the mode, suspends the reading out of the image, deletes the image data obtained from the original document image whose reading was suspended, and moves the scanning unit to a home position.

4 Claims, 5 Drawing Sheets

IMAGE FORMING APPARATUS

RELATED APPLICATION

This application is based on Japanese Patent Application Nos. 2007-43525 and 2007-281475, each respectively filed on Feb. 23, 2007 and Oct. 30, 2007 in Japan Patent Office, the entire content of which is hereby incorporated by reference.

BACKGROUND OF THE INVENTION

1. Field of the Invention

The present invention relates to image forming apparatuses such as copying machines, facsimiles, etc., that form images on sheets of paper.

2. Description of the Related Art

Conventionally, an image reading apparatus is known in which, when installing an image reading apparatus in an automobile and carrying out image reading while moving, at the time that a vibration sensor detects excessive vibrations such as when traveling on a bad road, etc., the image reading is suspended and the original document is transported in the reverse direction, and the reading out is restarted after vibrations are no longer detected (for example, Japanese Unexamined Patent Application Publication No. Hei 11-284801).

In recent years, users of image forming apparatuses are asking for high image quality, and even image forming apparatuses are moving in the direction of outputting images with a high image quality.

It is known that in image forming apparatuses outputting images with such high image quality, even very small vibrations such as those during attaching or detaching the sheet supply trays are likely to cause abnormalities in the reading of images from the original document, and the quality is likely to get deteriorated.

The invention disclosed in Japanese Unexamined Patent Application Publication No. Hei 11-284801 has the purpose of providing an image reading apparatus in which there is no image deterioration even when vibrations stronger than a presumed strength are generated while the image reading apparatus is installed in an automobile and the automobile is traveling, and in order to achieve this purpose, a vibration sensor is installed, the image reading is suspended and the original document is transported in the reverse direction at the time that said vibration sensor detects excessive vibration, and the reading out is restarted after vibrations are no longer detected.

Therefore, for example, it is possible that small vibrations such as those described above may not be detected by a vibration sensor whose purpose is to detect vibrations above a certain strength that are presumed to be generated while traveling on a bad road, and there was the problem that the output image quality decreased consequently in an image forming apparatus having such an image reading apparatus.

In addition, since the vibrations during traveling include vibration components in multiple directions, although it is necessary to detect vibrations with components in multiple directions in order to counter such vibrations, there is the problem that, in general, a vibration sensor that can detect vibrations in multiple directions is costly and hence increases the cost of the image forming apparatus.

The present invention is made in view of the above problems, and the purpose of the present invention is to provide an image forming apparatus that is low in cost and that does not cause decrease in the quality of the output image even when there are small vibrations at the time of attaching or detaching the sheet supply trays.

SUMMARY

According to one aspect of the present invention, there is provided an image forming apparatus, the image forming apparatus comprising: an automatic document feeding apparatus that conveys an original document; a document table on which an original document is to be placed; a reading section that reads out an image of the original document; a storage section that stores image data obtained by reading out the image of the original document read out by the reading section; a sheet feeding section that feeds sheets of paper; and a control section, wherein the control section executes reading out of the image of the original document either in a first mode in which the image of the original document is read while being conveyed by the original document using the automatic document feeding apparatus, or in a second mode in which the image of the original document is read while the reading section scans the image of the original document placed on the document table, the sheet feeding section has a sheet feeding tray that stores sheets and an attachment detection sensor that detects whether or not the sheet feeding tray is attached, and wherein the control section, when the attachment or detachment of the sheet feeding tray is detected by the attachment detection sensor during execution of reading out of the image in the first mode, suspends the conveying of the original document for reading of the original document image by the automatic document feeding apparatus, deletes from the storage section the image data obtained from the original document image whose reading was suspended, and conveys in a reverse direction the original document whose reading was suspended to a starting position of conveying, and when the attachment or detachment of the sheet feeding tray is detected by the attachment detection sensor during execution of reading out of the image in the second mode, suspends a scanning by a scanning unit of the reading section and the reading out of the original document image by the reading section, deletes from the storage section the image data obtained from the original document image whose reading was suspended, and moves the scanning unit of the reading section to a home position.

DETAILED DESCRIPTION OF THE PREFERRED EMBODIMENTS

Figure 1:
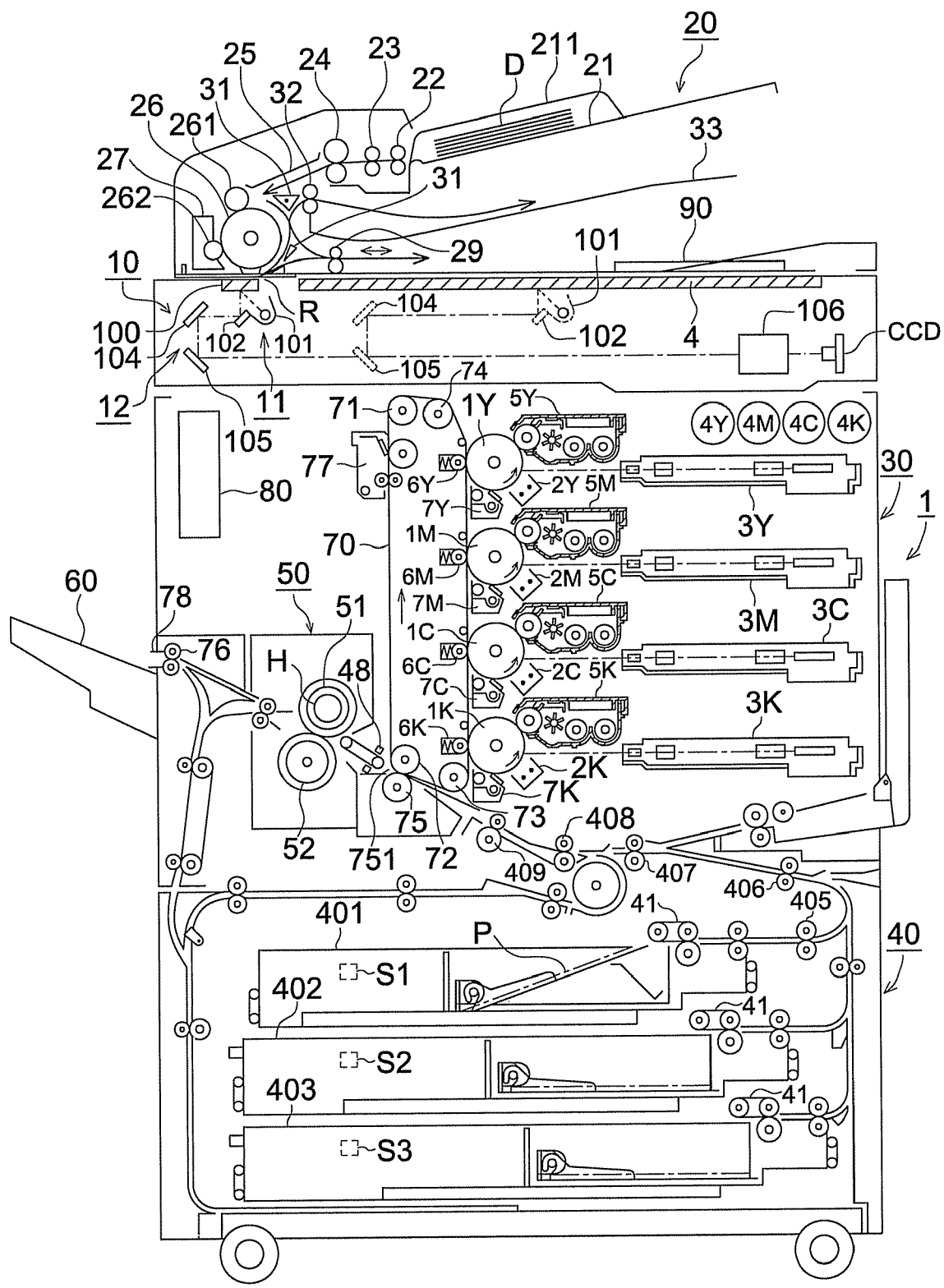
FIG. 1 is an outline cross-sectional diagram of an image forming apparatus.

In the following, some preferred embodiments of the present invention are explained referring to the drawings.

However, the configuration of the present invention shall not be construed to be limited to the following preferred embodiments, but can be modified suitably within the technical range of the present invention.

The vibrations generated in an image forming apparatus are mainly the vibrations generated when a sheet feeding tray as a sheet tray is attached to or detached from said image forming apparatus, and the vibrations generated during the opening and closing of the door for maintenance, and the following explanations are given taking the example of preventing deterioration in the image quality due to vibrations at the time of attaching or detaching a sheet feeding tray.

FIG. 1 is an outline cross-sectional diagram of an image forming apparatus.

The explanations below are given taking the example of a tandem type full color copying machine as the image forming apparatus.

The image forming apparatus 1 has an automatic document feeding apparatus 20, a reading section 10, an image forming section 30 and a sheet feeding section 40, a fixing apparatus 50, and a sheet discharge tray 60 for stacking the fixed sheets.

As the modes of reading out, the image forming apparatus 1 has a first reading out mode of reading out after conveying the document D to the reading out region R by the automatic document feeding apparatus 20, and the second mode of reading out the document D that has been placed on a platen glass 4 without carrying out automatic conveying of the document D.

The sheets used in the image forming apparatus can be paper sheets, OHP sheets, etc.

The reading section 10 is placed above the image forming section 30 that forms images, and the images of the original document D are illuminated by the reading section 10 and its image is formed on to and read by the line image sensor CCD.

The automatic document feeding apparatus 20 is placed above the reading section 10, and in said first mode, the image of the document D conveyed by the automatic document feeding apparatus 20 is read out by illuminating it in the staying still state by the scanning unit of the reading section 10 and forming its image onto the line image sensor CCD.

Further, in said second mode in which the automatic document feeding apparatus 20 is not used, the image of the original document placed on the platen glass 4 by an operator and in a staying still state is read out by forming its image on to the line image sensor CCD while scanning by the scanning unit of the reading section 10.

The analog signal of the original document image obtained by photoelectric conversion by the line image sensor is subjected to analog signal processing, A/D conversion, shading correction, image compression processing, etc., by an image processing section not shown in the figure, thereby becoming the digital image data of the colors of Y (Yellow), M (Magenta), C (Cyan), and K (Black).

The image forming section 20 that forms images using an electro-photographic process is configured to have photoreceptors 1Y, 1M, 1C, and 1K, charging units 2Y, 2M, 2C, and 2K, exposing units 3Y, 3M, 3C, and 3K, toner replenishment units 4Y, 4M, 4C, and 4K, developing units 5Y, 5M, 5C, and 5K, primary transfer rollers 6Y, 6M, 6C, and 6K, cleaning sections 7Y, 7M, 7C, and 7K, an intermediate image transfer member 70, rollers 71, 72, 73, and 74, a secondary transfer roller 75, and a cleaning section 77.

The drum shaped photoreceptors 1Y, 1M, 1C, and 1K corresponding to the different colors Y, M, C, and K are charged uniformly by the charging units 2Y, 2M, 2C, and 2K corresponding to the different colors.

The exposing units 3Y, 3M, 3C, and 3K corresponding to the different colors form the latent images on the photoreceptors 1Y, 1M, 1C, and 1K based on the digital image data of each color.

Toners of different colors from the toner replenishment units 4Y, 4M, 4C, and 4K that replenish toners of different colors are supplied to the developing units 5Y, 5M, 5C, and 5K, and the latent images corresponding to the different colors formed on the photoreceptors 1Y, 1M, 1C, and 1K are made apparent by the developing units 5Y, 5M, 5C, and 5K.

The developing units 5Y, 5M, 5C, and 5K and the photoreceptors 1Y, 1M, 1C, and 1K are placed in parallel along the vertical direction, and to the left side of the photoreceptors 1Y, 1M, 1C, and 1K in the figure is placed an endless belt shaped partially conducting intermediate image transfer member 70 that is passed over the rollers 71, 72, 73, and 74 so that it is free to rotate.

Further, the intermediate image transfer member 70 is being driven in the direction of the arrow by a motor coupled to the drive roller 71.

The primary transfer rollers 6Y, 6M, 6C, and 6K corresponding to the different colors are operated selectively by the control section depending on the type of image, and press the intermediate image transfer member 70 against the respective photoreceptors 1Y, 1M, 1C, and 1K.

In this manner, the toner images of different colors formed on the photoreceptors 1Y, 1M, 1C, and 1K by the developing units 5Y, 5M, 5C, and 5K are successively primary-transferred on to intermediate image transfer member 70 by the primary transfer rollers 6Y, 6M, 6C, and 6K thereby forming a superimposed color toner image.

After the toner images are transferred on to the intermediate image transfer member 70 by the primary transfer rollers 6Y, 6M, 6C, and 6K, the photoreceptors 1Y, 1M, 1C, and 1K have the residual toner on them removed by the cleaning sections 7Y, 7M, 7C, and 7K.

The sheet feeding section 40 has a first sheet feeding tray 401, a second sheet feeding tray 402, and a third sheet feeding tray 403, and sheets P are stored in each sheet feeding tray.

A sheet P is fed by the sheet feeding unit 41, passes over a plurality of intermediate rollers 405, 406, 407, 408, etc. and over a register roller 409 and is conveyed up to the secondary transfer region 751, and the color toner image on the intermediate image transfer member 70 is transferred at once to the sheet P by the secondary transfer roller 75.

The sheet feeding section 40 is provided with a first, a second, and a third installation detection sensors S1, S2, and S3 that detect whether or not the first, second, and third sheet feeding trays 401 are attached to the image forming apparatus, and the control section 80 is constantly monitoring the ON/OFF signals from each of the tray detection sensors at all times.

Further, the first, second, and third sheet feeding trays are attached and detached in the front-back direction shown in the figure.

The first, second, and third installation detection sensors S1, S2, and S3 are provided at the deep end in the sheet feeding tray attaching and detaching direction as is indicated by broken lines in the figure, and when installed at the deep end of the sheet feeding tray, the sheet feeding tray is detected and an ON signal is output.

The secondary transfer roller 75 is pressed and comes into contact with the roller 72 via the intermediate image transfer member 70 only when the sheet P has passed and secondary transfer is being made.

The sheet on to which a color toner image has been transferred is subjected to fixing processing by the fixing unit 50 having a heating roller 51 with a built in heater H and a pressure contacting roller 52, gripped by the sheet discharge rollers 76, and exhausted on to the sheet discharge tray 60 from the sheet discharge outlet 78 and is collected there.

After the color toner image has been transferred on to the sheet by the secondary transfer roller 75, the intermediate image transfer member 70 has the residual toner on it removed by the cleaning section 77.

The operation panel 90 is provided on the top surface of the reading section 10, is equipped with a touch panel and various types of operation switches, etc., various types of information and various operation keys are displayed in the touch panel, and the input information of the switches and the keys is input to the control section 80.

Detailed explanations are given in the following regarding the automatic document feeding apparatus 20 and the reading section 10.

The automatic document feeding apparatus 20, after separating one sheet at a time from the document D stacked on it and conveying it to the reading out region R, discharges the document sheet to the document discharge tray 33.

The document tray 21 has a restricting member 211, and the edge part of the document D in a direction at right angles to the direction of feeding its sheets is restricted and aligned by the restricting member 211.

The feed out roller pair 22 that can be raised or lowered is connected to a drive source (not shown in the figure), and feeds out the top most document sheet in the document D placed on the document tray 21.

The separation feed out roller pair 23 placed on the downstream side of the feed out roller pair 22 becomes a separation roller having a torque limiter along with the feed out roller connected to a drive source.

The registration roller pair 24 placed further down the downstream side than the separation feed out roller pair 23 has become the starting point of conveying the document, and adjusts the timing of feeding the document D to the reading out region A.

It is possible to use, for example, a stepping motor as the drive source of the feed out roller pair 22, the separation feed out roller pair 23, and the registration roller pair 24.

The document D fed from the registration roller pair 24 which becomes the starting position of conveying the document is conveyed in the direction of the arrow along the guide plates 25, and is not only gripped by a rotating large diameter conveying drum 26 and slave rollers 261 and 262, but also guided by the guide 27, conveyed along the outer peripheral surface of the conveying drum 26, and arrives at the read out region R.

When the document D passes through the read out region R in which the conveying drum 26 and the slit glass 100 constituted from a transparent member such as glass, the image on the surface of the document is read out by the reading section 10.

The document D that has passed through the read out region R, after it has been conveyed in the upward direction in the figure, in the case of single side reading out, is guided by the selective guiding member 31 and it discharged on to the document discharge tray 33 by the discharge rollers 32.

In the case of double side reading out, the conveying direction is reversed by the reverse conveying rollers 29, conveyed again to the conveying drum 26 by the selective guiding member 31, conveyed to the read out region R and its reverse side is read out.

Next, after being conveyed by the reverse conveying rollers 29, the document is guided by the selective guiding member 31, and discharged on to the document discharge tray 33 by the discharge rollers 32.

The reading section 10 reads out the image of the document D conveyed from the automatic document feeding apparatus 20 or the image of the document D placed on the platen glass 4.

The reading section 10 has a scanning unit 11 having a light source 101, a first mirror 102, a second mirror 104 and a third mirror 105, all formed integrally.

The light source 101 is a Xenon lamp or a fluorescent lamp. The first to the third mirrors 102, 104, and 105 are respectively rectangular mirrors having their longer sides along the scanning direction. The light source 101 and the first to the third mirrors 102, 104, and 105 are respectively placed parallel to each other.

In the first mode, the scanning unit 11 is kept stationary and the image of the document D conveyed to the reading out region R by the automatic document feeding apparatus 20 is read out. The light source 101 illuminates the document D conveyed to the reading out region R, and the reflected light L from the image of the document D is focused on the line image sensor CCD via the first, second, and third mirrors 102, 104, and 105, and via the focusing lens 106.

The position of the scanning unit light source 101 illuminates the reading out region R and the image of the document D is focused on the line image sensor CCD is taken as the home position.

In the second mode, at the time of scanning the scanning unit and reading out the image of the document D placed on the platen glass 4, the scanning unit is scanned in the auxiliary scanning direction (the direction towards the right indicated by broken lines in the figure) from the home position, and the image of the original document is read out during scanning.

Figure 2:
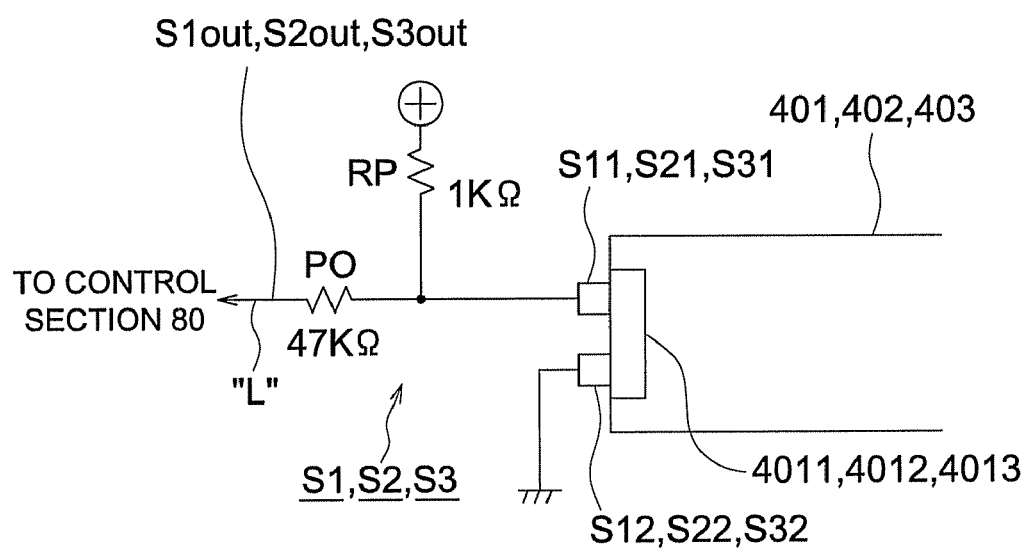
FIGS. 2(a) and 2(b) are explanatory diagrams of sheet tray installation sensors.
Figure 2:
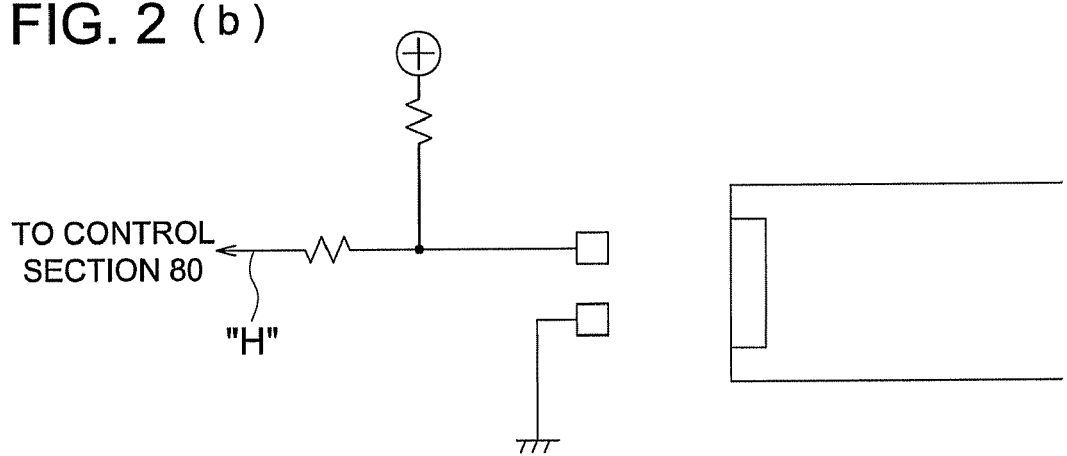

FIGS. 2(a) and 2(b) are explanatory diagrams of sheet tray installation sensors.

FIG. 2(a) shows the state in which a sheet feeding tray is attached inside the image forming apparatus, and FIG. 2(b) shows the state in which the sheet feeding tray has been detached from the image forming apparatus.

Further, attaching a sheet feeding tray refers to the condition in which it has been set inside the image forming apparatus at a position at which it can feed sheets.

Insertion is the process of attaching a sheet feeding tray inside the image forming apparatus and the time of attaching implies the instant of time of changing from the detached state to the attached state by inserting.

Removal is the process of detaching a sheet feeding tray from the image forming apparatus and the time of detaching implies the instant of time of changing from the attached state to the detached state by removing.

Since each of the attachment detection sensors S1 to S3 that detect whether each of the sheet feeding trays 401 to 403 have been attached inside the image forming apparatus have the same structure and operation, explanations are given taking the example of the first attachment detection sensor S1.

The first attachment detection sensor S1 has a first detection member S11 of the plus side that contacts with the contacting part 4011 provided in the first sheet feeding tray 401 when the first sheet feeding tray 401 is attached inside the image forming apparatus, and a second detection member S12 on the ground side.

The other end of the first detection member S11 is connected to the control section 80 via a resistor PO, and the contact point between the first detection member S11 and the resistor PO has been pulled up by connecting to the positive side of the power supply (can also be the negative side of the power supply depending on the circuit configuration) via a resistor RP.

The second detection member S12 is connected to the 0V side of the power supply.

The first detection member S11, the second detection member S12, and the contacting part 4011 are made of a conductive material.

Further, during the period when the first sheet feeding tray 401 has been attached inside the image forming apparatus [FIG. 2(a)], the first detection member S11 and the second detection member S12 are short-circuited by the contacting part 4011.

Because of this, the output voltage $S1_{OUT}$ of the first detection member S11 goes to the L level.

Further, during the period when the first sheet feeding tray 401 has been detached from the image forming apparatus [FIG. 2(b)], the first detection member S11 and the second detection member S12 are not short-circuited by the contacting part 4011.

Because of this, the output voltage $S1_{OUT}$ of the first detection member S11 goes to the H level.

Therefore, the output voltage $S1_{OUT}$ changes from the H level to the L level at the time of attaching the first sheet feeding tray 401 inside the image forming apparatus. Also, at the time of its removal, the output voltage $S1_{OUT}$ changes from the L level to the H level, thereby making it possible to detect the attaching and detaching of the sheet feeding tray.

If a similar detection member is installed for detecting the opening and closing of the door for maintenance, it will also be possible to detect vibrations related to opening and closing this door.

Figure 3:
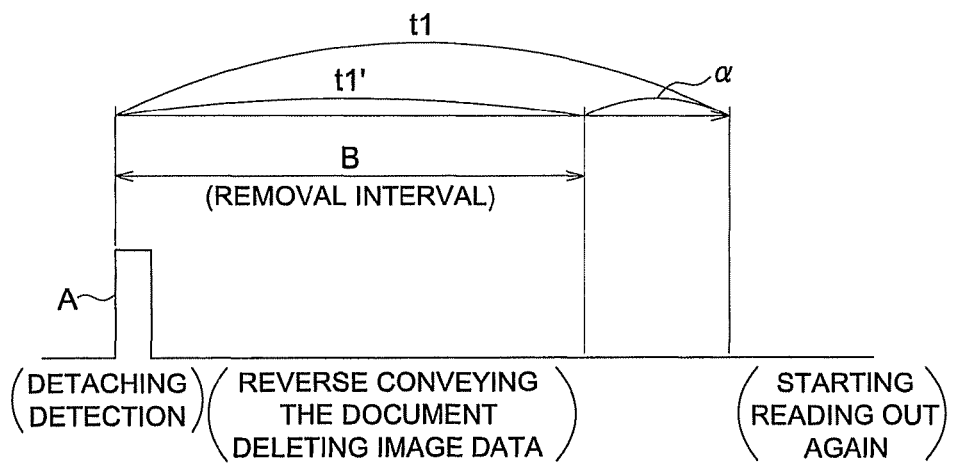
FIGS. 3(a) and 3(b) are explanatory diagrams showing the relationship between the output of the installation sensor and the reading out, etc. of the original document.
Figure 3:
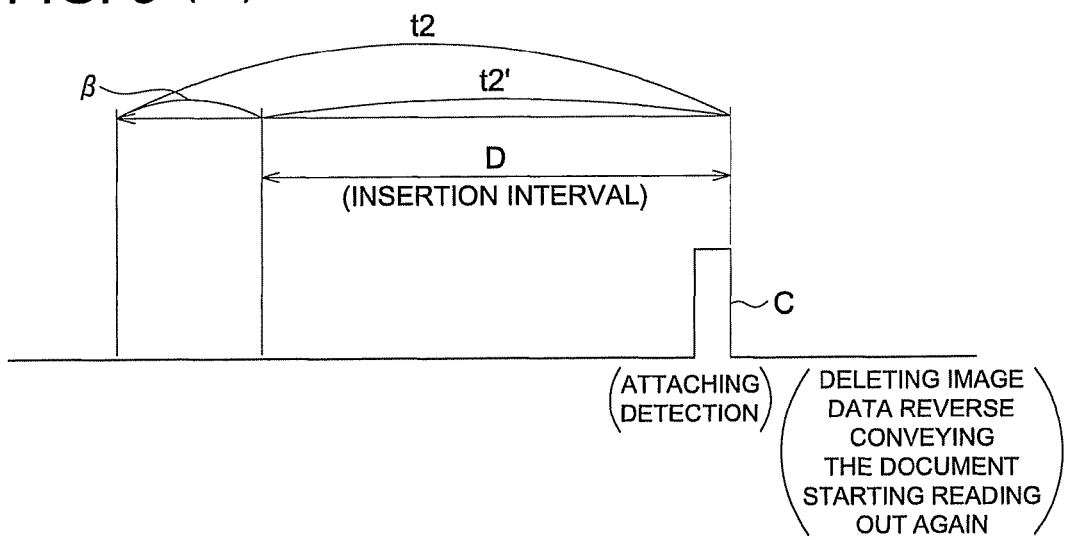

FIGS. 3(a) and 3(b) are explanatory diagrams showing the relationship between the output of the installation sensor and the reading out, etc. of the original document.

The horizontal axis denotes the passage of time and the time passes from left to right in the figure.

FIG. 3(a) shows detaching a sheet feeding tray and FIG. 3(b) shows attaching a sheet feeding tray.

In FIG. 3(a), A indicates the time of detaching, that is, the instant of time when the output voltage $S1_{OUT}$ changes from the L level to the H level, as explained in FIGS. 2(a) and 2(b).

B is the removal time necessary for the operation of detaching the sheet feeding tray.

Conveying and reading out the document is suspended at the time A of detaching the sheet feeding tray. After suspending conveying the document, the image data of the document whose conveying was suspended is deleted from the storage section, and the document whose conveying was suspended is conveyed back to the starting position of conveying.

After a prescribed time interval t1 has elapsed from the time A of detaching the sheet feeding tray, the document is conveyed again and reading out of the image of the document is carried out again.

Further, in order not to start the reading out the image of the document until the detaching operation has been complete definitely, the prescribed time t1 is set by adding a margin time interval a to the time interval t1' necessary for the normal removal operation.

In FIG. 3(b), C indicates the time of attaching, that is, the instant of time when the output voltage $S1_{OUT}$ changes from the H level to the L level, as explained in FIGS. 2(a) and 2(b).

Conveying and reading out the document is suspended at the time C of detaching the sheet feeding tray, after suspending conveying the document, the image data of the document whose conveying was suspended is deleted from the storage section, the document whose conveying was suspended is conveyed back to the starting position of conveying, and thereafter, the conveying again of the document that was conveyed back to the starting position of conveying and the reading out again of the images of the document that was conveyed again are carried out. When attaching of the sheet feeding tray is detected, since there is no operation thereafter as in removal, there is no problem even if reading again is carried out immediately without waiting for a prescribed time interval to elapse.

D indicates the insertion time interval necessary for the operation of inserting the sheet feeding tray.

Here, although it is possible to read out the images of the original document from the time C of attaching of the sheet feeding tray because the operation of insertion is completed definitely at the time C of attachment, during the insertion interval D, it is possible that the reading out is not made normally because of the vibrations due to the insertion operation.

Therefore, it is desirable that not only the data read out at the time of attachment but also the data read out during a prescribed time interval t2 before the time C of attaching of the sheet feeding tray is deleted from the storage section and is read out again.

Further, in order to definitely exclude the image of the document that was read out while the insertion operation was being made, it is desirable that the prescribed interval of time t2 is set by adding a margin time interval β to the time interval t2' necessary for the normal insertion operation.

In the case of reading the image of the document placed on the platen glass without using the automatic document feeding apparatus, in FIGS. 3(a) and 3(b), conveying the document, conveying back the document to the starting position of conveying, and the conveying again of the document become unnecessary.

As was explained above referring to FIGS. 2(a) and 2(b) and FIGS. 3(a) and 3(b), by detecting using existing tray detection sensors with an extremely simple structure the attaching and detaching of sheet feeding trays that generate very small vibrations compared to the severe vibrations stronger than a presumed strength that are generated when the image forming apparatus is placed in a moving vehicle, it is possible to suppress the cost increase of image forming apparatuses.

Figure 4:
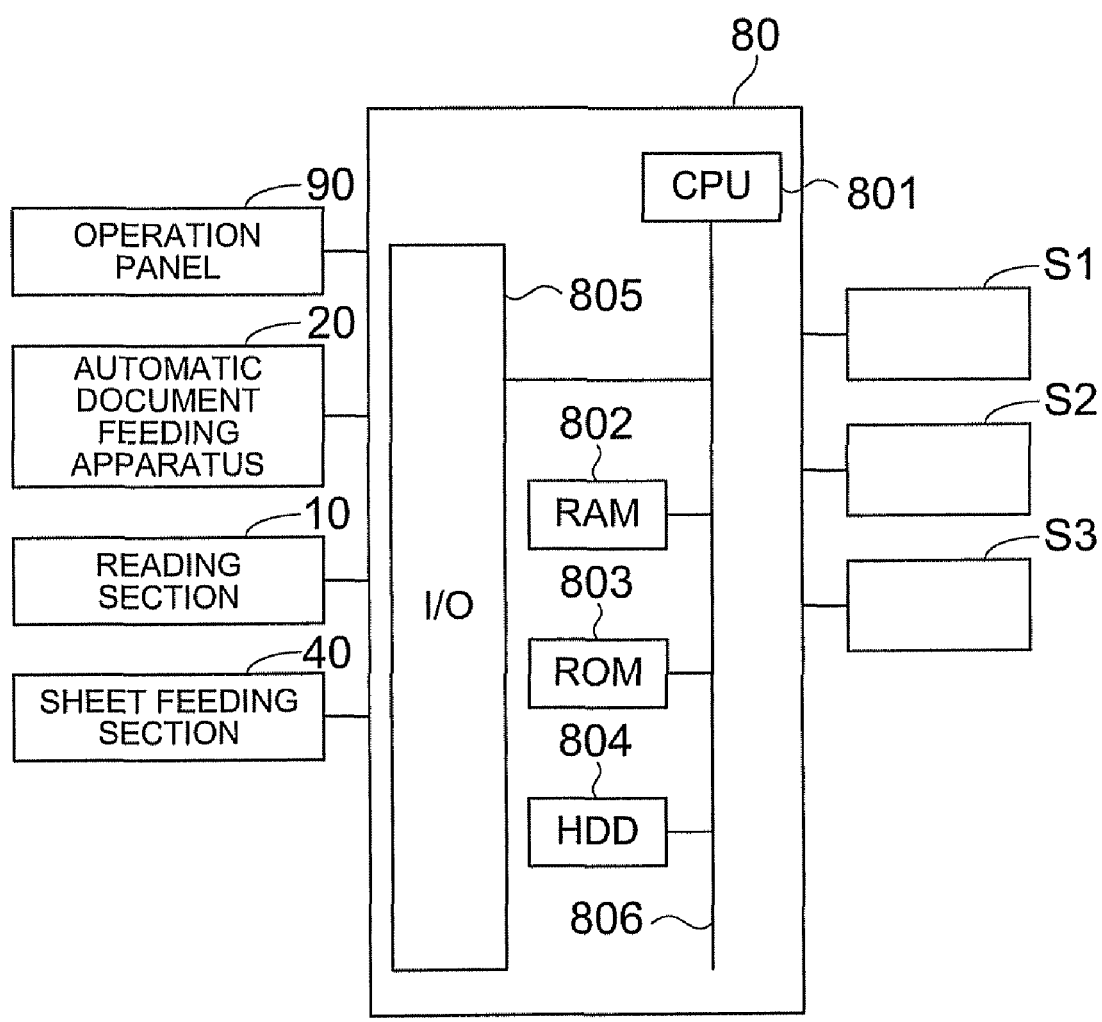
FIG. 4 is a first block diagram related to the control of the reading section 10 and the automatic document feeding apparatus 20 at the time of attaching or detaching a sheet feeding tray.

FIG. 4 is a block diagram related to the control of the reading section 10 and the automatic document feeding apparatus 20 at the time of attaching or detaching a sheet feeding tray.

In the following, referring to FIG. 1 and FIG. 4, the configuration related to control of the reading section 10 and the automatic document feeding apparatus 20 is explained for the case of reading out using the automatic document feeding apparatus 20.

The control section 80 has a CPU 801 (Central Processing Unit, a RAM 802 (Random Access Memory), a ROM 803 (Read Only Memory), an HDD 804 (Hard Disk Drive), an I/O controller 805 that control various members under the control of the CPU 801, and a bus 806 that mutually connects all of these.

A program that controls the entire image forming apparatus and the programs, etc., for controlling the reading section 10 and the automatic document feeding apparatus 20 at the time of attaching and detaching sheet feeding trays described later are stored beforehand in the ROM 803, and the CPU 801 expands these programs successively in the RAM 802 and then executes them.

The HDD 804 which is the storage section temporarily stores the digital image data to which image processing such as image compression, etc., has been made. Further, it is also possible to store temporarily the digital image data, etc., in the RAM 802 as the storage section.

The operation panel 90 carries out, under control of the CPU 801 and via the I/O controller 805, the display of the different operation screens and the reading mode selection key for the reading section, etc., and the operation information selected on the operation screens (input information of different keys) is input to the control section 80.

When the start key of the image forming apparatus is input from the operation panel 9, the automatic document feeding apparatus 20, under the control of the CPU 801 and via the I/O controller 805, actuates the feed out roller pair 22, the separation feed out roller pair 23, the registration roller pair 24, the conveying drum 26, etc., and conveys the document D to the reading out region, and thereafter discharges it to the document discharge tray 33.

Further, The automatic document feeding apparatus 20 and the main unit of the image forming apparatus are provided with connectors (not shown in the figure) to which are connected signal lines, and the control information is exchanged between the main unit of the image forming apparatus and the automatic document feeding apparatus 20 via the connectors.

The reading section 10 is positioned at the home position described earlier, and under the control of the CPU 801 via the I/O controller 805, reads out the image of the original document conveyed by the automatic document feeding apparatus 20, and inputs the analog image data to the control section 80.

The control section 80 digitizes the analog image data and stores it in the HDD 804.

The first, second, and third attachment detection sensors S1, S2, and S3 detect that the first, second, and third sheet feeding trays 401, 402, and 403 have been attached to the image forming apparatus, and, under the control of the CPU 801 and via the I/O controller 805, inputs the attachment signals to the control section 80.

The sheet feeding section 40, under the control of the CPU 801 and via the I/O controller 805, feeds a sheet from the prescribed one among the first, second, and third sheet feeding trays 401, 402, and 403 based on the sheet feeding tray information input from the operation panel 9.

In addition, the image forming section, under the control of the CPU 801 and via the I/O controller 805 and based on the image data read out from the HDD, forms a latent image on the photoreceptor using the laser diode of the exposing section, and forms the toner image using the developing unit.

Further, the toner image is transferred and fixed on to the sheet fed by the sheet feeding section 5.

The sheet conveying section, under the control of the CPU 801 and via the I/o controller 805, positions the sheet P fed from the sheet feeding section 5 at the registration rollers 46 and conveys it towards the transfer position 351 at a prescribed timing.

The fixing section 50, under the control of the CPU 801 and via the I/O controller 805, adjusts the temperature of the heated roller 71 and carries out fixing of the toner image.

The re-feeding section, under the control of the CPU 801 and via the I/o controller 805, carries out reversal of the sheet in the sheet reversing section and feeds the sheet again in the case of double sided printing.

Figure 5:
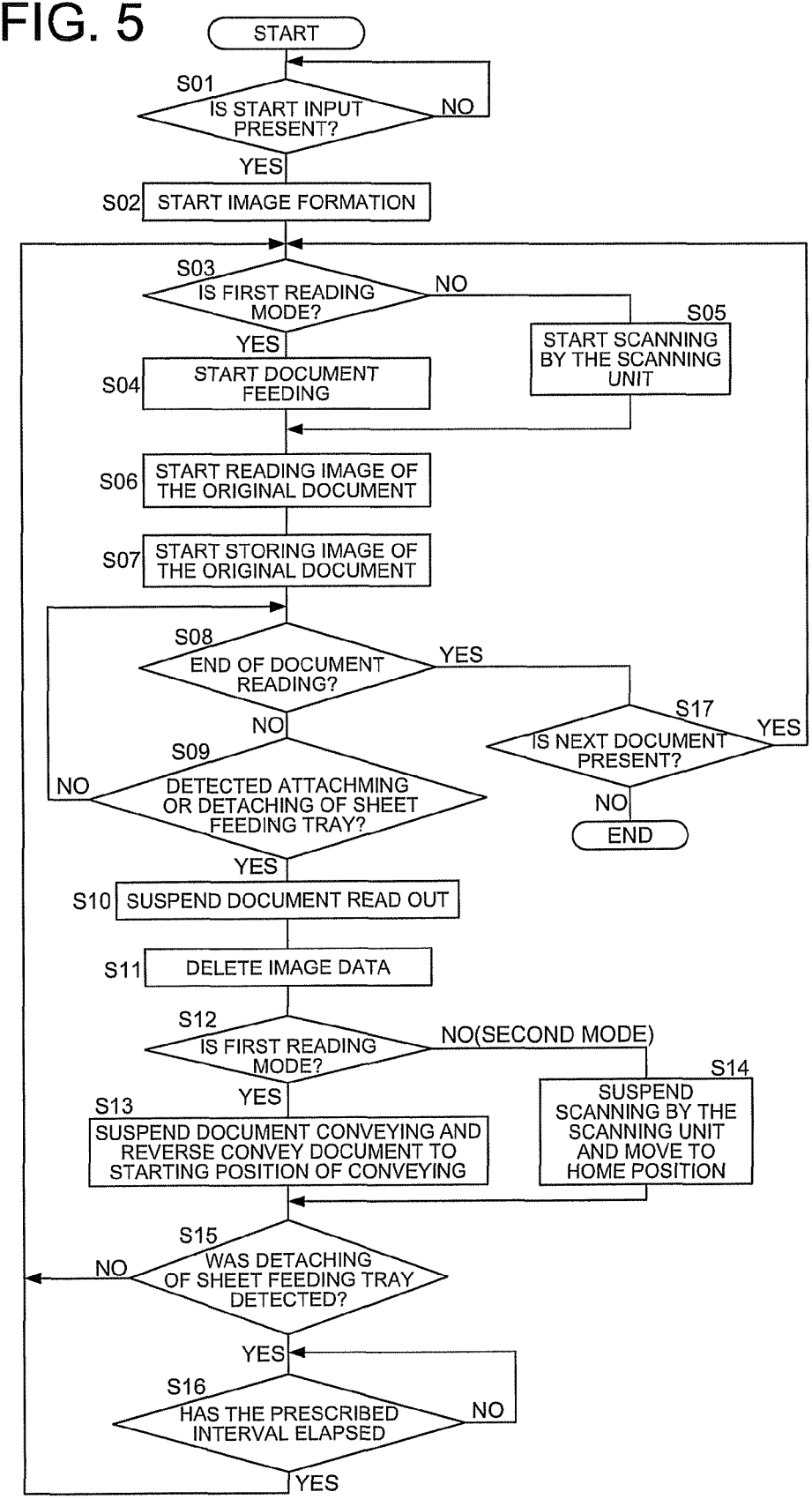
FIG. 5 is a block diagram related to the control of the reading section 10 and the automatic document feeding apparatus 20 at the time of attaching or detaching a sheet feeding tray in an image forming apparatus.

FIG. 5 is a block diagram related to the control of the reading section 10 and the automatic document feeding apparatus 20 at the time of attaching or detaching a sheet feeding tray in an image forming apparatus.

The control of the reading section 10 and the automatic document feeding apparatus 20 at the time of attaching or detaching the sheet feeding trays 401, 402, or 403 is explained in the following referring to FIG. 1, FIG. 4, and FIG. 5.

The control of image forming is started (Step S02) when the start key in the operation panel 90 is input by an operator (Step S01). To begin with, the control section 80 judges whether the reading mode is the first reading mode or not (Step S03). If it is the first reading mode (Yes in Step S03), it controls the automatic document feeding apparatus 20 and starts the conveying of the sheets of the original document (Step S04). In the automatic document feeding apparatus 20, the feed out roller pair 22, the separation feed out roller pair 23, the registration roller pair 24, and the conveying drum 26, etc., start rotating in the forward direction, and a sheet of the original document D is conveyed to the reading out region R.

The control section 80 starts reading out the image of the document conveyed to the reading out region R using the reading section 10 (Step S06).

On the other hand, if it is not the first reading mode (No in Step S03), that is, if it is the second reading mode, the scanning of the scanner unit is started (Step S05) after which the operation moves on to Step S06 similar to the above.

The control section 80, carries out analog signal processing, A/D conversion, shading correction, and image compression processing on the image data of the document read in by the reading section 10, and starts storing as digital data for each of the colors of Y (Yellow), M (Magenta), C (Cyan), and K (Black) in the storage section such as the HDD 804, etc. (Step S07).

Next, a judgment is made as to whether or not the reading out of the document is completed in the reading section 10 (Step S08).

If the reading of the document has not been completed in the reading section 10 (No in Step S08), that is, if the reading out is still in progress, the operation proceeds to the next step S09.

In Step S09, the control section 80 monitors the change in the output voltages of each of the attachment detection sensors S1, S2, and S3, and judges whether or not a sheet feeding tray has been attached or detached (Step S09).

The monitoring of the output voltages of the attachment detection sensors is done at intervals of 5 to 50 ms, and done desirably at intervals of 10 ms.

If the interval is longer than this, if the attachment or detachment of a sheet feeding tray is done immediately before the ending of reading out a document, it is possible that the detection is not made and the image quality gets deteriorated. Also, if the interval is short, the load on the CPU becomes high and there is the possibility that the overall process is hindered.

Further, very often the detaching of a sheet feeding tray is prohibited by locking the sheet feeding tray while a sheet is being fed, and in such cases, the judgment of the presence of attachment or detachment of a sheet feeding tray is carried out for the sheet feeding trays other than the sheet feeding tray that is feeding a sheet at present.

If attaching or detaching of a sheet feeding tray is not detected (No in Step S09), the operation returns to Step S08, and the judgment is carried out repeatedly until the reading of the document is completed.

If attaching or detaching of a sheet feeding tray is detected (Yes in Step S09), the control section 80 suspends the reading out by the reading section 10 (Step S10), and, in addition, erases the image data of the page being read out and stored in the storage section (Step S11).

Next, the control section carries out a judgment of whether the reading mode is the first reading mode or not (Step S12). If the reading mode is the first reading mode (Yes in Step S12), it suspends the conveying of the document, and conveys back the document that was being read out to the starting position of conveying (Step S13).

On the other hand, if the reading mode is not the first reading mode (No in Step S12), that is, if the reading mode is the second reading mode, the control section 80 stops the scanning by the scanning unit, and moves the scanning unit to the home position (Step S14).

Next, the control section judges whether the attachment or detachment detected to be present in Step S09 is an attachment or a detachment (Step S15). Here, the control section 80 judges that the sheet feeding tray was attached when the detected voltage changed from the H level to the L level, and judges that the sheet feeding tray was detached when the detected voltage changed from the L level to the H level.

When the control section judges that it was a detaching of the sheet feeding tray (Yes in Step S15), it judges whether or not a prescribed interval of time has elapsed (Step S16), and if the prescribed interval of time has elapsed (Yes in Step S16), the operation proceeds to Step S03, and the reading out is carried out again. If the prescribed interval of time has not elapsed (No in Step S16), it repeats the judgment of Step S16.

On the other hand, if the control section judges that it was not a detaching of a sheet feeding tray (No in Step S15), that is, if it was an attachment, the operation proceeds to Step S03 and the reading out is carried out again.

In addition, when the control section 80 judges in Step S08 that the reading of a document has been completed (Yes in Step S08), it judges whether or not there is a next document (Step S17). When the control section 80 judges that there is a next document (Yes in Step S17), the operation returns to Step S03, and a similar flow is continued.

On the other hand, if the control section 80 judges that there is no next document (No in Step S17), it ends the flow of operations (END).

As was explained above referring to FIG. 1, FIG. 4, and FIG. 5, in an image forming apparatus having a reading section and an automatic document feeding apparatus and executing the first reading mode, if the attaching or detaching of a sheet feeding tray is detected, after suspending the conveying of document sheets by the automatic document feeding apparatus and the reading of the document by the reading section due to that detection, by conveying again and reading out the document whose conveying was suspended, it is possible to provide an image forming apparatus that doses not lower the output image quality even if there are small vibrations such as during the attaching or detaching of a sheet feeding tray.

In addition, in an image forming apparatus that does not have an automatic document feeding apparatus but has a reading unit and a scanning unit and executes the second reading mode, if the attaching or detaching of a sheet feeding tray is detected, after suspending the scanning of the scanning unit of the reading section and suspending the reading out operation due to that detection, by scanning again the scanning unit and carrying out reading of the document whose reading out was suspended, it is possible to provide an image forming apparatus that doses not lower the output image quality even if there are small vibrations such as during the attaching or detaching of a sheet feeding tray.

Further, by providing an opening and closing detection member in the door for maintenance and detecting the opening or closing of the door, and by carrying out processing similar to that during the attaching or detaching of a sheet feeding tray, it is possible to provide an image forming apparatus that doses not lower the output image quality even if there are small vibrations such as during the opening or closing of the door.

In addition, in the present preferred embodiment, by detecting the attaching and detaching of a sheet feeding tray using an attachment detection sensor that detects the attachment or detachment of a sheet feeding tray, the reading out the document is suspended and is read out again, and the image formation is carried out based on the image of the original document that is read out again. Because of this, it is possible, without providing new sensors and at low cost, to provide an image forming apparatus that doses not lower the output image quality even if there are small vibrations such as during the attaching or detaching of a sheet feeding tray.

What is claimed is:

1. An image forming apparatus comprising:
   an automatic document feeding apparatus that conveys an original document;
   a document table on which an original document is to be placed;
   a reading section that reads out an image of the original document;
   a storage section that stores image data obtained by reading out the image of the original document read out by the reading section;
   a sheet feeding section that feeds sheets of paper; and
   a control section, wherein
   the control section executes reading out of the image of the original document either in a first mode in which the image of the original document is read while being conveyed by the original document using the automatic document feeding apparatus, or in a second mode in which the image of the original document is read while the reading section scans the image of the original document placed on the document table,
   the sheet feeding section has a sheet feeding tray that stores sheets and an attachment detection sensor that detects whether or not the sheet feeding tray is attached, and wherein
   the control section, when the attachment or detachment of the sheet feeding tray is detected by the attachment detection sensor during execution of reading out of the image in the first mode, suspends the conveying of the original document for reading of the original document image by the automatic document feeding apparatus, deletes from the storage section the image data obtained from the original document image whose reading was suspended, and conveys in a reverse direction the original document whose reading was suspended to a starting position of conveying, and when the attachment or detachment of the sheet feeding tray is detected by the attachment detection sensor during execution of reading out of the image in the second mode, suspends a scanning by a scanning unit of the reading section and the reading out of the original document image by the reading section, deletes from the storage section the image data obtained from the original document image whose reading was suspended, and moves the scanning unit of the reading section to a home position.

2. The image forming apparatus of claim 1, wherein when the control section detects a detachment of the sheet feeding tray with an output of the attachment detection sensor, a) during execution of reading out of the image in the first mode, the control section controls the automatic document feeding apparatus so as to convey again the document that has been conveyed to the starting position for reading the image of the document after a prescribed time interval has elapsed from the time when the detachment of the sheet feeding tray has been detected, and b) during execution of reading out of the image in the second mode, the control section controls the scanning unit that has been moved to the home position so as to start a scanning again after a prescribed time interval has elapsed from the time when the detachment of the sheet feeding tray has been detected.

3. The image forming apparatus of claim 1, wherein when the control section detects an attaching of the sheet feeding tray with an output of the attachment detection sensor, a) during execution of reading out of the image in the first mode, the control section controls the automatic document feeding apparatus so as to convey again the document that has been conveyed back to the starting position for reading the image of the document immediately, and b) during execution of reading out of the image in the second mode, the control section controls the scanning unit that has been moved to the home position so as to start a scanning again immediately and controls the reading section to read out the image.

4. An image forming apparatus comprising:
   a document table on which an original document is to be placed;
   a reading section that reads out an image of the original document placed on the document table;
   a storage section that stores image data obtained by reading out the image of the original document by the reading section;
   a sheet feeding section that feeds sheets of paper; and
   a control section, wherein
   the control section executes reading out of the image of the original document in a mode in which the image of the original document is read while the reading section scans the image of the original document placed on the document table,
   the sheet feeding section has a sheet feeding tray that stores sheets and an attachment detection sensor that detects whether or not the sheet feeding tray had been attached, and wherein
   the control section, when the attachment or detachment of the sheet feeding tray is detected by the attachment detection sensor during execution in the mode, suspends a scanning by a scanning unit of the reading section and the reading out of the original document image by the reading section, deletes from the storage section the image data obtained from the original document image whose reading was suspended, and moves the scanning unit of the reading section to a home position.

* * * * *